United States Patent [19]
Closs et al.

[11] 3,856,993
[45] Dec. 24, 1974

[54] TIME DIVISION MULTIPLEX EXCHANGE

[75] Inventors: Felix H. Closs; Hans R. Mueller, both of Adliswil; Daniel Wild, Kilchberg, all of Switzerland

[73] Assignee: International Business Machines Corporation, Armonk, N.Y.

[22] Filed: Oct. 16, 1973

[21] Appl. No.: 407,003

Related U.S. Application Data

[63] Continuation of Ser. No. 206,614, Dec. 10, 1971, abandoned.

[52] U.S. Cl..... 179/15 AT, 179/15 BV, 179/15 BY, 179/15 BS, 179/15 AL

[51] Int. Cl. ............................................. H04j 3/06

[58] Field of Search ........ 179/15 AL, 15 A, 15 AQ, 179/15 AT, 15 BA, 15 BS, 15 BY, 15 BV, 15 BM

[56] References Cited

UNITED STATES PATENTS

| | | | |
|---|---|---|---|
| 3,641,273 | 2/1972 | Herold | 179/15 BA |
| 3,718,769 | 2/1973 | Jacob | 179/15 AQ |
| 3,754,100 | 8/1973 | Jacob | 179/15 AQ |

FOREIGN PATENTS OR APPLICATIONS

| | | | |
|---|---|---|---|
| 416,376 | 4/1966 | Japan | 179/15 AQ |

*Primary Examiner*—Ralph D. Blakeslee
*Attorney, Agent, or Firm*—John A. Jordan

[57] ABSTRACT

A decentralized time division multiplex communication system having independent exchange modules arranged to individually set up connections without the need of central control. Commonality of hardware is limited to a simple interconnection unit, and a clock allowing synchronization of all modules. Each exchange module, with its associated group of terminals, is arranged to form a time division multiplex system of first order. The exchange modules, together with the interconnection unit, are arranged to form a super-multiplex system, i.e., a time division multiplex system of second order. All bus line time division multiplex channels of all exchange modules are interspersed on the interconnection unit. To each of these bus line channels, a time slot is permanently assigned in the super-multiplex time frame.

9 Claims, 7 Drawing Figures

INVENTORS
FELIX H. CLOSS
HANS R. MUELLER
DANIEL WILD

BY John A. Jordan
ATTORNEY

TIME DIVISION MULTIPLEX EXCHANGE

This is a continuation of application Ser. No. 206,614 filed Dec. 10, 1971, now abandoned.

BACKGROUND OF THE INVENTION

The present invention relates to a time division multiplex exchange for communication systems.

Exchanges of this type, having a certain modularity, are known in the art. Such exchanges comprise equal modules, i.e., building blocks, the number of which is determined by the size of the system, with the size of the system being determined by the number of terminals attached to the system. Modularity has the advantage that a stepwise extension of the system is possible. In addition, the modules are easier to exchange and to replace because they are equal.

In all of the systems known in the art, however, a central control monitors the modules, and the message exchange between them, and controls the setting up of connections. Such arrangements have the disadvantage that the central control must, from the beginning, be designed for the maximum configuration, i.e., for the maximum number of modules. Furthermore, the complete system is paralyzed when a failure or a breakdown of the central control occurs.

It is therefore an object of the present invention to provide an exchange for a time division multiplex communication system which is completely modular and decentralized, i.e., which has no central control.

It is a further object of the present invention to provide an arrangement whereby the switching of voice and data, i.e., an integrated operation for different types of messages, is possible.

It is yet a further object of the present invention to provide a time division multiplex organization which allows the switching of data from terminals with different speeds, including data which are generated at low speed or asynchronously.

It is still a further object of the present invention to provide exchange modules which are relatively simple despite their capabilities, particularly in view of the fact that in setting up connections no complicated operations are necessary. Furthermore, the invention minimizes the number of connection lines between modules.

In accordance with the present invention, a time division multiplex exchange for communication systems is provided, which system is characterized by a plurality of exchange modules, each of which communicates with a group of terminals in time division multiplex over at least one bus line, said exchange modules being connected to each other by an interconnection unit which they use in time division multiplex, each exchange module comprising such control means that any connection between terminals can be set up solely by the module, or modules, involved.

The foregoing and other objects, features and advantages of the invention will be apparent from the following more particular description of a preferred embodiment of the invention, as illustrated in the accompanying drawings.

DETAILED DESCRIPTION OF THE DRAWINGS

System Principles

Figure 1:
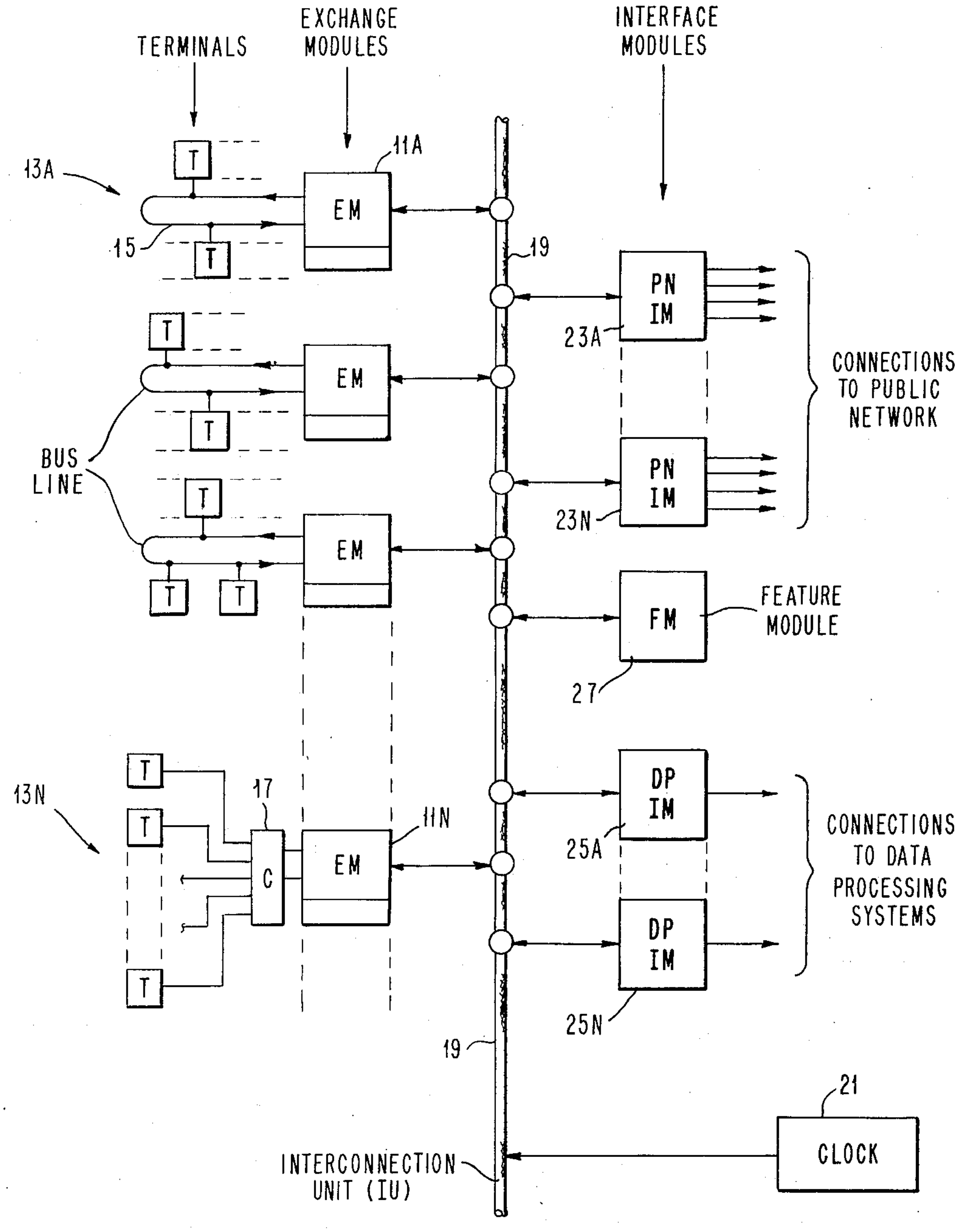
FIG. 1 shows a block diagram of the time division multiplex exchange in accordance with the present invention.

FIG. 1 shows a block diagram of an embodiment of the exchange, in accordance with the present invention. On the left-hand side a number of exchange modules EM, designated 11A to 11N, is shown each of which serves a group of terminals T, respectively designated 13A to 13N. These terminals may be telephone apparatus, teleprinters, data collection devices, input keyboards, display units, etc. Each group of terminals can be connected to its associated exchange module EM by a loop 15, passing along all terminals. The messages to be transmitted are collected and transferred on this loop already in time division multiplex (distributed multiplex structure). Instead of one loop only, several loops may be connected as bus lines to one exchange module, a sub-group of terminals being associated to each of these lines. Also, a star configuration of the connection between terminals and their exchange modules may also be provided as well. For this arrangement, a concentrator C, designated 17 in FIG. 1, is required interspersing, in time multiplex, the signals arriving on the individual lines and transferring them in this mode to the exchange module EM, designated 11N. In this case, analog signals, e.g., voice signals, may be transferred, in analog form, as far as the location of the exchange module and would be digitalized only at the concentrator.

The exchange modules communicate with each other over an interconnection unit IU, designated 19 in FIG. 1. The total system is based on the following principle: each group of terminals constitutes, with its exchange module, a time division multiplex system of first order. Therefore, there are as many simultaneous multiplex systems of first order as there are exchange modules. On the other hand, the modules together with the interconnection unit IU constitute a super-multiplex system, i.e., a time division multiplex system of second order. All bus line time division multiplex channels of all exchange modules are interspersed on the interconnection unit IU. To each of these bus line channels a time slot is permanently assigned in the supermultiplex frame. Details will be described hereinafter, in connection with FIGS. 2 through 4.

The exchange modules are so designed that they can execute independently all control and supervising functions. The intermediate storage necessary for time slot exchange and the actual switching function are combined in an elegant manner and optimally executed by a special associative store, which is provided in each of the modules.

The main advantages of the multiplexing arrangement, in accordance with the present invention, are the following:

a. The interconnection unit IU is nothing more than a piece of multiple line or, if the exchange modules are located remote to each other, a multiple line closed loop;
b. The system is decentralized. The setting up of a connection is effected solely by the involved modules; no central control is necessary. The only common devices which are necessary are the simple interconnection unit IU and a clock 21 allowing synchronization of all modules;
c. The system is modular. The upper capacity limit is given by the frame of the super-multiplex system which must be determined at the beginning. Within this limit any number of modules can be connected to the system; a stepwise extension of the system is easily possible because no central unit is required. For each additional group of terminals another exchange module must simply be added.

On the right-hand side of FIG. 1 a few modules are shown which differ from the exchange modules EM. The provision of these modules is useful for certain tasks; however, it does not alter the decentral and modular character of the system.

The modules PN IM, designated 23A to 23N in FIG. 1, are junction modules to the public network. These modules are necessary if the system described here is a private branch exchange. The junction modules DP IM, designated 25A to 25N in FIG. 1, allow for a connection to data processing systems. All of these modules IM represent interfaces and, accordingly, vis-a-vis the interconnection unit IU, they show the same behavior as the exchange modules EM. Therefore, the IM can communicate with the interconnection unit IU in the manner already described. In the output direction, the IM show characteristics as required by the public network or by the data processing systems, respectively.

Finally, a feature module FM designated 27 is shown which can execute common functions such as, e.g., setting up conference calls or locating errors, which do not warrant the inclusion of special circuitry in the individual exchange modules EM (although this would be possible in principle).

If a replacement exchange module is provided in the exchange system, for the purpose of taking over the function of an active exchange module in the event of the failure, then the feature module FM would be provided with further circuitry which can recognize the failure, and control the switching over from the faulty to the replacement module.

In the following, the organization of the time division multiplex operation, the associative exchange stores and their function, as well as the example of a single exchange module are described in more detail.

Time Division Multiplex Organization

Figure 2:
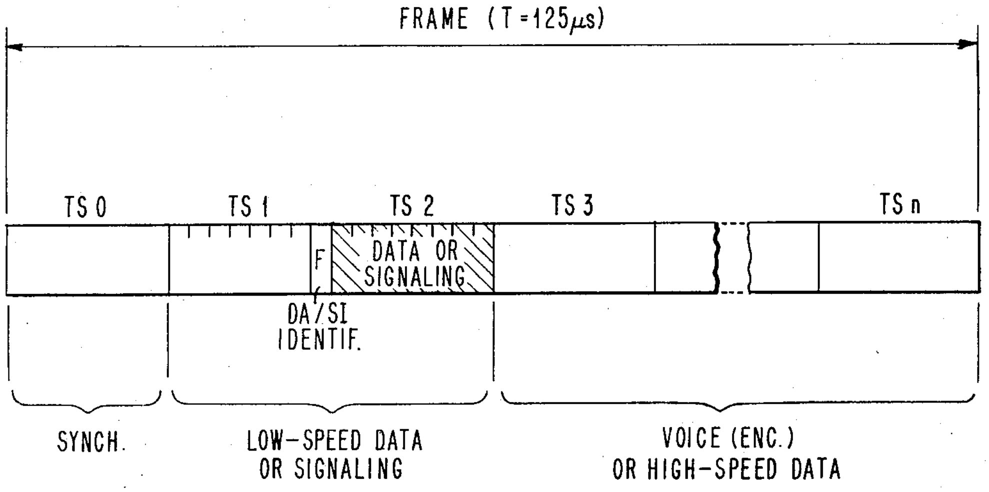
FIG. 2 shows the structure of a time division multiplex frame on a bus line.

FIG. 2 shows the structure of the frame on the bus lines (e.g., line 15 in FIG. 1) of the exchange modules EM, i.e., the organization of the time division multiplex operation of first order. Each frame has a duration of 125 $\mu$s, which corresponds to the standardized sampling frequency for voice. It is subdivided into a certain number, such as 32, of equal time slots, each of which corresponds to eight bits (a ninth bit may be added for parity checking). This allows transfer in each time slot of one coded voice sample (PCM), or eight bits of a delta-modulated voice signal, or a data byte of eight bits. To simplify the description, not all of these possibilities are always mentioned in the following description. In most cases, reference is made only to the coded speech sample (PCM), but it should be understood that the other possibilities are likewise applicable.

The first time slot TSO serves for synchronization purposes. The next two following time slots, TS1 and TS2, constitute together a submultiplex channel which is constantly available for the transmission of slowly generated data between terminals, or for the transmission of signaling information between any terminal of the group and the exchange module. It can also be used for direct signaling between terminals, in which case the signaling information is transmitted in the same manner as the low-speed data. This channel is seized each time, for the duration of one frame only, by inserting into time slot 1 the address of the sending or receiving terminal, respectively. A flag bit F indicates whether the next time slot TS2 contains a data byte or signaling information. When data are transmitted between two terminals, the sender address must be converted into a receiver address each time in the exchange module.

The following time slots TS3 through TS*n* represent normal time division multiplex channels over which coded voice or rapidly generated data, can be transmitted at a repetition frequency of 8 kHz. Each of these channels is exclusively assigned to one connection for the duration of this connection.

Figure 3:
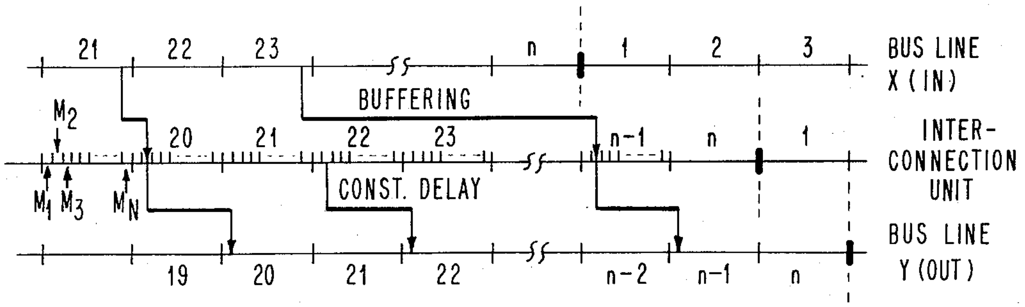
FIG. 3 shows the principle of exchange of information units between bus lines of different exchange modules over the interconnection unit.

FIG. 3 illustrates the principle of "slot interchange", i.e., the message exchange between two terminals in a two-level time division multiplex organization. The upper and lower row correspond to the multiplex bus lines of two different exchange modules. Each numbered section represents a time slot. The row in the middle corresponds to the interconnection unit. In this row, each numbered section represents a time segment. Each of these time segments on the interconnection unit must contain one time slot for each of the exchange modules EM. Therefore, the n time segments are all subdivided into a plurality of subsections (=time slots), the number of which corresponds to the number of exchange modules EM which the system will eventually contain in the maximum configuration.

When a message element (time slot contents) is exchanged between a sending and a receiving channel, a time displacement between two different time slots is necessary, as well as a spatial displacement between two exchange modules. The spatial displacement is also executed as an assignment in time by the two-level time division multiplex organization.

Out of several possibilities for voice switching, one solution was selected for the embodiment, the principles of which will become more clear with reference to FIG. 3. On the interconnection unit, each time slot is permanently assigned to a receiving module (cf. $M_1$, $M_2$, $M_3$...$M_N$ at the left-hand side of the figure). In the sending module, each voice sample, i.e., each PCM-byte (the same is true for data bytes of higher speed terminals), is intermediately stored. When the time slot corresponding to the receiving module and the receiving terminal (= receiving channel) is available on the interconnection unit at the connection point of the sending module, the voice sample (or the data byte, respectively) is gated to the interconnection unit. Due to the permanent assignment, the receiving module must only extract the data elements out of "its own" time slots of the interconnection unit, and gate them to its bus line. This involves a constant delay because of the necessary parallel-to-series conversion and because of switching processes. However, no control operations dependent on the individual connection are required.

In connection with FIG. 3, only the switching processes for voice or for data of higher speed terminals, respectively, are described. A somewhat different solution, within the two-level time division multiplex operation, is selected for signaling and for the switching of data from lower speed terminals. This is described in the following, in connection with FIG. 4.

Figure 4:
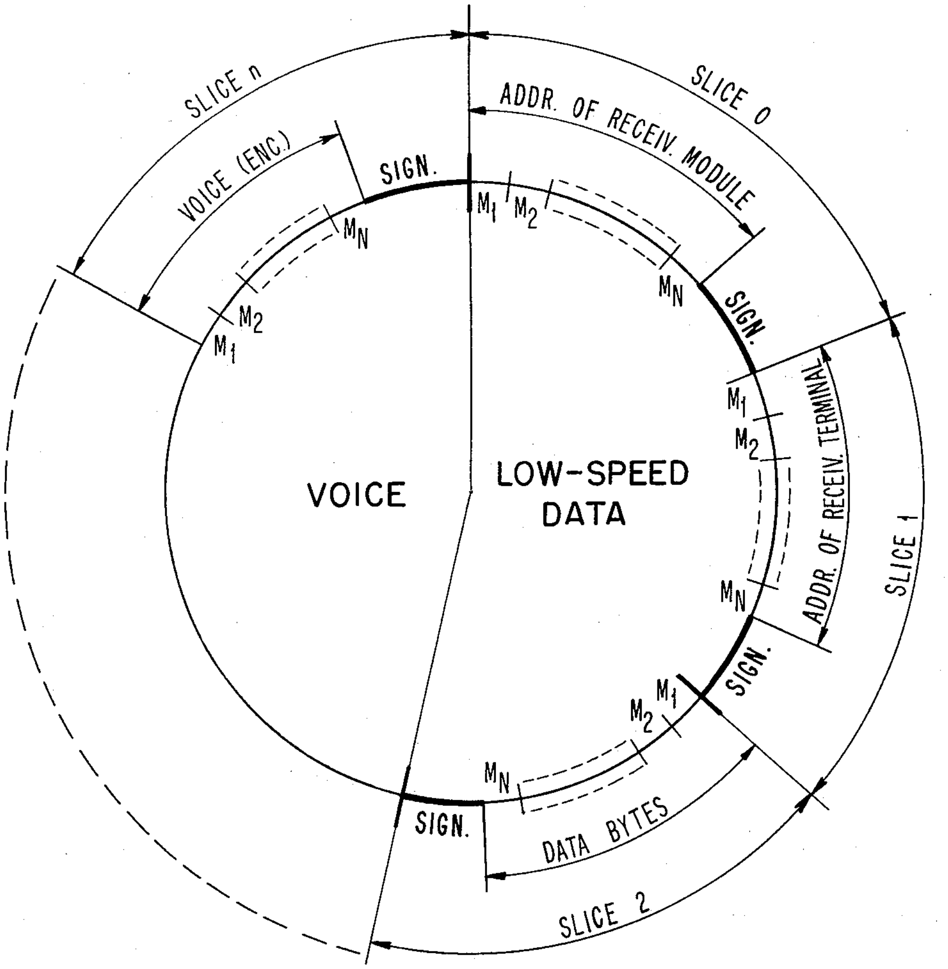
FIG. 4 shows the structure of a time division multiplex frame on the interconnection unit.

In FIG. 4, one frame of the interconnection unit is represented by a circle. The conditions, that a frame has a duration of 125 μs, and that the number of segments on the interconnection unit is equal to the number of time slots on the bus lines, are also assumed here. For the transmission of low speed data, the first three segments on the interconnection unit are used in a similar manner as on the bus lines. In the first segment (0), the address of the receiving module is transmitted. In the second segment (1), the address of receiving terminal is transmitted. Finally, in the third segment (2) the actual data byte is transmitted.

Time slots within the first three segments on the interconnection unit are permanently assigned to the sending modules ($M_1$, $M_2$...$M_N$). This is different from the situation in voice switching, where time slots on the interconnection unit are permanently assigned to receiving modules. The reason is the following: during one frame it is possible that low speed data from different sending modules are transmitted to one and the same receiving module, and must be accepted by this module even through it has only one single bus line channel for the transmission of low speed data. Therefore, for switching of low speed data, the sending module inserts the address of the receiving module into the time slot assigned to it in segment 0 on the interconnection unit. In segment 1 the address of the receiving terminal is inserted and, finally, in segment 2 the data byte to be transmitted is inserted.

For the receipt of low speed data, all exchange modules monitor the addresses passing on the interconnection unit in the first segment. If a module recognizes its own address, it stores the slot number and extracts from the time slots having equal number, in segments 1 and 2 which follow, the address of the receiving terminal, and the data byte.

In addition to the time slots permanently assigned to the exchange modules, an area for signaling is provided in each segment. These areas are generally available channels for interchange of signaling information between modules. In these channels, the receiver address is also preferably transmitted first, and then the signaling information, and possibly also the sender address. This requires that each module also monitor during the signaling intervals, if its address appears on the interconnection unit, so that the immediately following signaling information can be gated into the module.

Segments 3 through n (in FIG. 4 only one is shown) are used for transmitting coded voice or "high speed" data, according to the principles as explained with regard to FIG. 3. In this part of the frame are the time slots permanently assigned to the receiving modules ($M_1$, $M_2$...$M_N$). A special area for signaling may also be provided in each of these segments.

These special signaling areas in all segments are not required if the signaling information is transmitted in the permanently assigned time slots of segments 0 through 2, in a similar manner as the low speed data. However, in this case a flag byte would be required for distinguishing between data and signaling information, as described with regard to the time division multiplex organization, on the bus lines.

The interconnection unit frame could also be arranged so that not only is a data byte transmitted in segment 2, but, in addition, a plurality of data bytes may be transmitted in respective segments 2, 3, etc. The additionally required segments (number 3, etc.) would, of course, no longer be available for the transmission of voice.

Summary of Time Division Multiplex Organization

Figure 5:
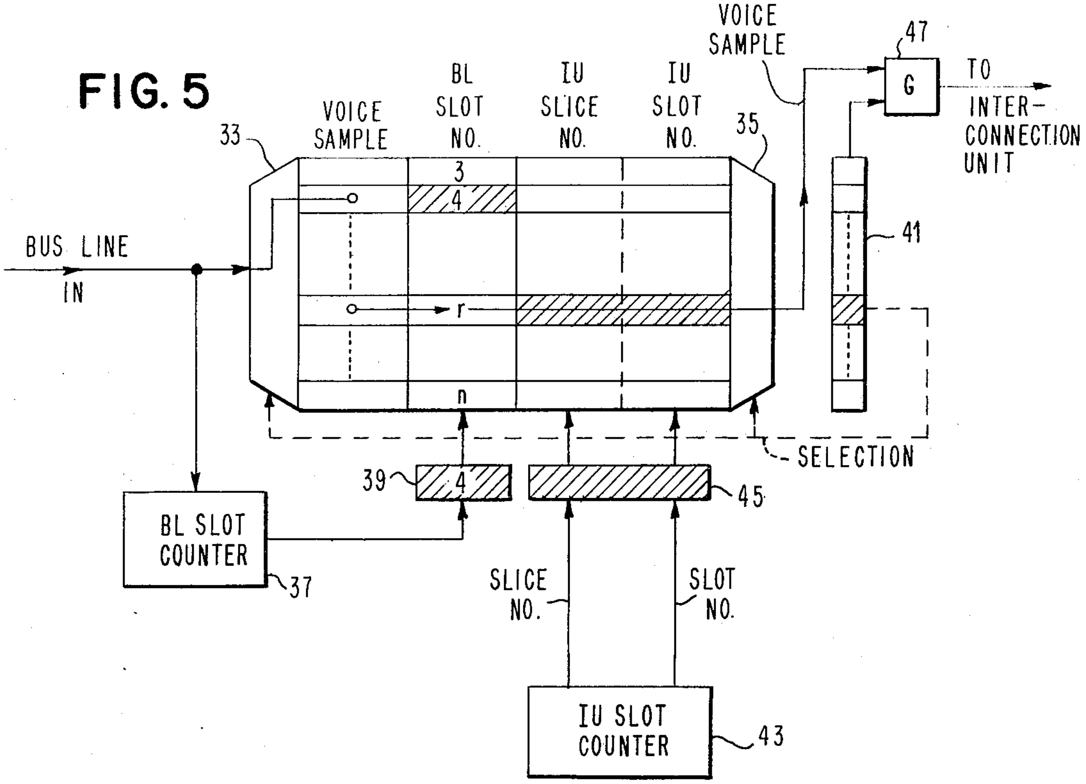
FIG. 5 shows an associative exchange store for cyclic switching.
Figure 6:
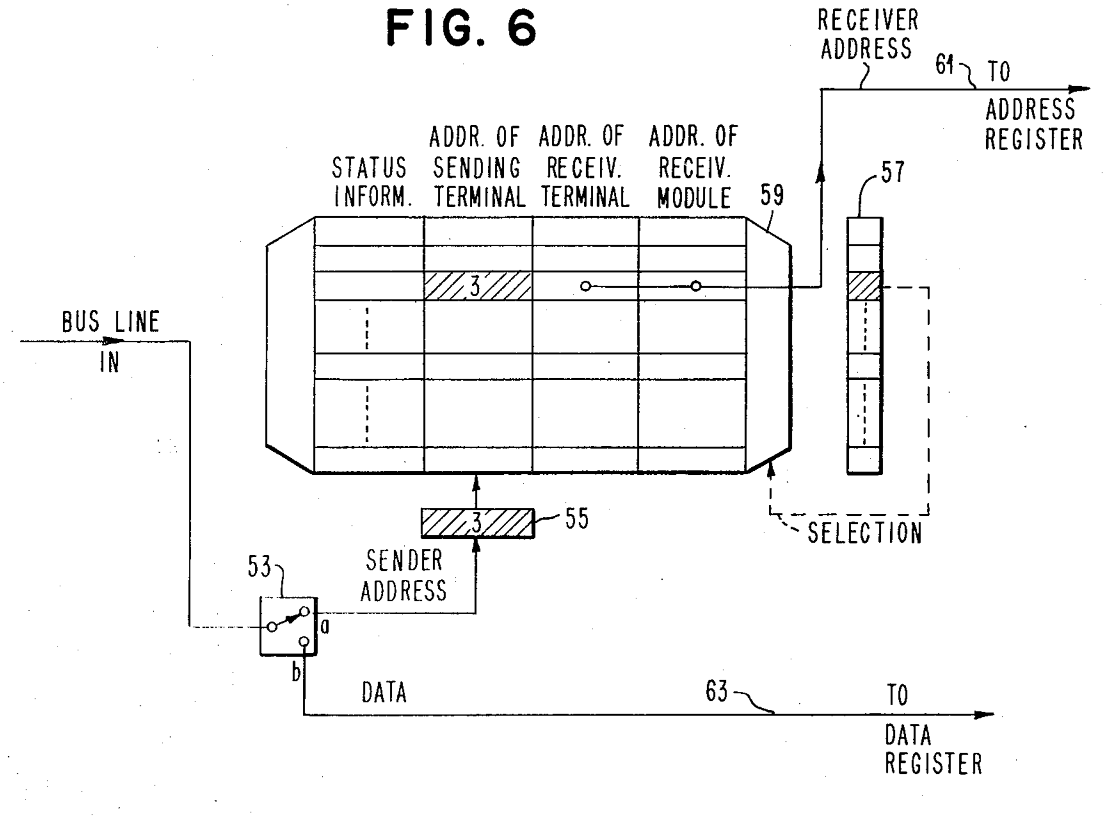
FIG. 6 shows an associative exchange store for address translation in asynchronous switching.
Figure 7:
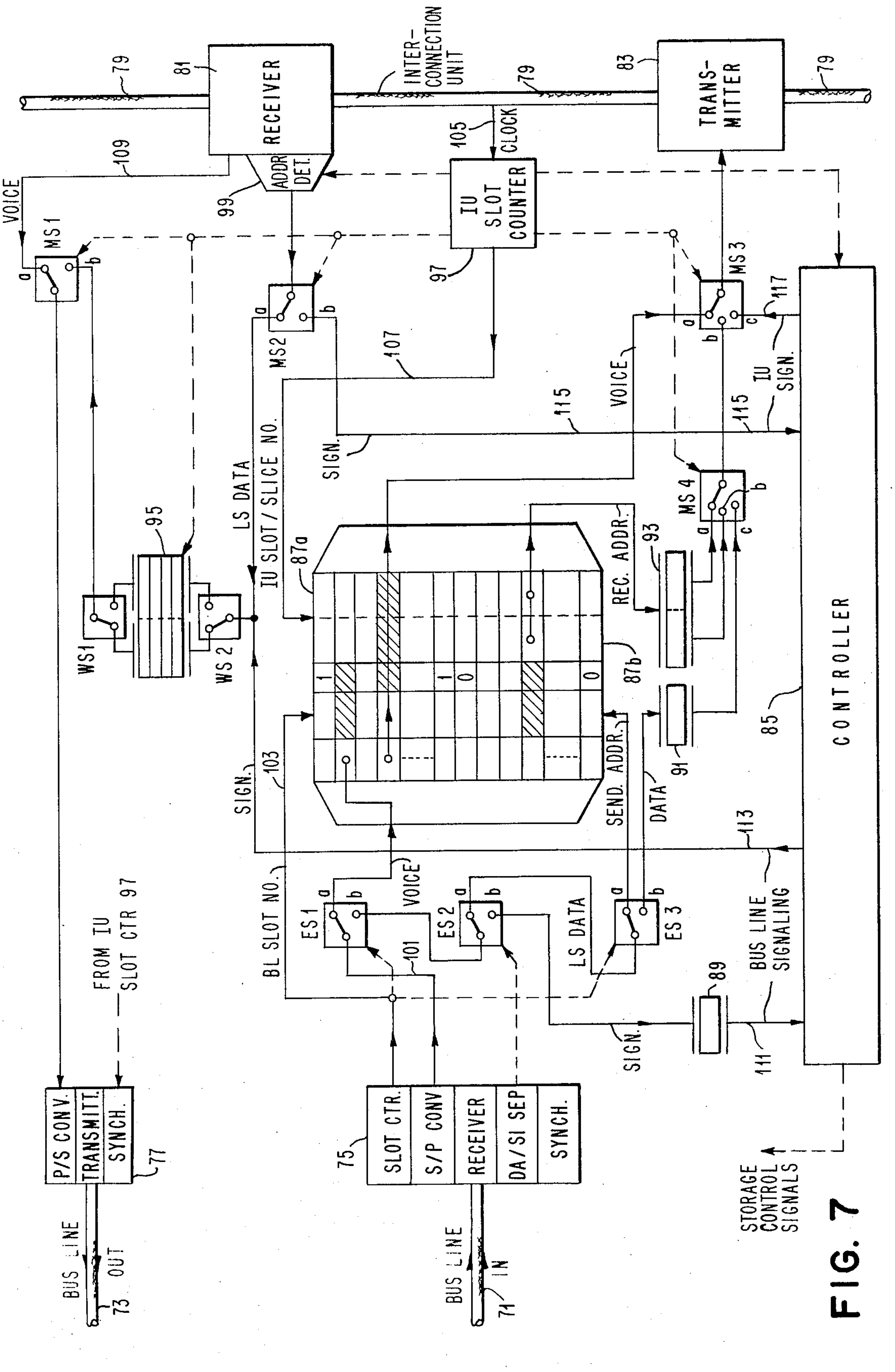
FIG. 7 shows the block diagram of a complete exchange module.

The most important features of the time division multiplex organization of the described embodiment are here summarized before entering into a description of the multiplex exchange apparatus of FIGS. 5, 6 and 7.

a. Voice and data of high speed terminals are switched in a cyclic manner (exclusive assigment of a channel for the whole duration of a connection).

b. Data of lower speed terminals, as well as asynchronously generated data, are switched by joint transmission of an address (assignment of a channel only for the duration of one frame, i.e., for the transmission of one byte, upon "request").

c. For switching of voice, time slots are permanently assigned, on the interconnection unit, to the receiving modules. The time segments correspond to the receiving channels on the bus lines.

d. for the switching of low speed data, the time slots are permanently assigned to the sending modules, in the first time segments of the frame, on the interconnection unit.

Exchange Store

In time division multiplex communication, information units which are extracted from a channel in subsequent cycles are stored intermediately, and then are cyclically released into another time channel, one after the other, according to an association table. In most of the known time division multiplex exchanges, two different stores are used for this purpose. One of these stores is the information store for the intermediate storage of voice samples, and the other store is an address or assignment store for random addressing of the information store. Such an arrangement makes it possible to read the information units in sequences other than the one in which they were written into the store.

For the system described here it is suggested to use as exchange store, an associative store. This results in the following list of significant advantages:

a. For storage of information units, as well as assigned addresses, only one store is required;

b. The logic design of the exchange is simplified;

c. The setting up of individual connections is considerably improved;

d. The whole exchange operates faster.

Because of the modular design of the exchange, in accordance with the present invention, each exchange module contains its own associative exchange store, the storage capacity of which corresponds to the number of channels provided by the module, for its terminals.

In connection with FIG. 5, the associative exchange store for voice connections, and its operation, is described. The associative store contains a number of storage locations (words) which correspond to the number of voice channels provided on the bus line. The storage locations are subdivided into four fields:

a. Voice sample (e.g., one PCM byte each);

b. Time slot number on the bus line (this corresponds to the sending channel);

c. Segment number on the interconnection unit (this corresponds to the receiving channel); and d. Time slot number on the interconnection unit (this corresponds to the receiving module).

Data can be written and read selectively over an input 33 and an output 35. For setting up a connection, the controller of an exchange module needs only to write into the location, corresponding to the sending channel, the segment number and the slot number which correspond to the receiving channel and the receiving module.

The operation of FIG. 5 is as follows: the voice samples (or data bytes) arriving on the bus line are written cyclically into subsequent positions of the store. Addressing is also associatively effected here with the time slot numbers, contained in the second column in ascending order, by slot counter 37, and a search register 39. In a marker register 41, a "1" is set for the storage location in which a matching slot number is found, so that input 33 is controlled correspondingly. Reading-out of a voice sample to the interconnection unit is effected when the time slot corresponding to the receiver is available. An interconnection unit slot counter 43 transfers the current segment number and slot number to a search register 45, the contents of which are compared to the corresponding fields of all storage locations. A marker is set in register 41 for that storage location in which a match is found, so that output 35 and a gate 47 are controlled in such a way that the voice sample is transferred to the interconnection unit at the right moment.

The presently described process is used for the cyclic switching of voice or high speed data for which channels are exclusively assigned, each to the sender and the receiver, for the duration of a connection.

For the switching of low speed data, the associative storage principle is used in a similar manner. However, some steps of the exchange process are different because in this case the channel is assigned only "upon request", and because the data to be transmitted are always accompanied by a sender or a receiver address.

The application of the associative exchange store for the switching of low speed data, from the submultiplex channel, is shown in FIG. 6. It may be recalled that on the bus line in slot 1 a sender address, and in slot 2 the corresponding data byte or signaling information, is transmitted to the exchange module (FIG. 2). If the data are to be further transmitted, the exchange module must convert the sender address into a receiver address and gate this, together with the subsequently following data byte, to the interconnection unit for further transmission. The associative store contains, for the connections "existing" at any time in its storage locations, the address of the sending terminal and a corresponding two-part receiving address, the latter being for the receiving terminal and the receiving module. A fourth field is provided in each storage location for status information on the sending terminal.

If data arrive in the submultiplex channel of the bus line, switch 53, as shown in FIG. 6, is in position *a* during slot 1, so that the sender address is gated to a search register 55. By associative comparison, it is determined which storage location contains this sender address, and a marker is set in register 57. Thereafter, the corresponding receiver address is transferred over output 59 and line 61 to an address register. In the following slot 2, switch 53 is in position *b*, so that the data from the submultiplex channel are gated over a line 63 to a data register. According to the scheme shown in FIG. 1, the two parts of the receiver address, and the corresponding data byte, can be gated to the interconnection unit in segments 0, 1 and 2 of the next following frame. These output operations will be described in more detail in connection with FIG. 7.

Exchange Module

FIG. 7 is a block diagram of a complete exchange module. Bus lines 71 and 73 are the input and output connection to the terminals. They may be either the two ends of a loop line as shown at 13A in FIG. 1, or two connection lines to a concentrator, as shown at 13N in FIG. 1. Signals on these lines are transferred in time division multiplex and bit-sequentially, as shown in FIG. 2.

Input block 75 contains the following units:

a. A receiver for the receipt and regeneration of signals;

b. A serial/parallel converter for buffering the incoming bits and for parallel output of one byte; i.e., the contents of a time slot, to the module;

c. A slot counter for currently indicating the slot number (the channel number) of the signals last received;

d. A data/signaling separator which generates a control signal depending on the flag bit F in slot 1 (FIG. 2);

e. A synchronizer.

Output block 77 contains the following units;

a. A transmitter for applying signals to the bus line;

b. A parallel/serial converter which receives each time, one information unit (coded voice sample or data byte) and transfers single bits sequentially to the transmitter;

c. A synchronizer which receives control signals corresponding to the clock of the interconnection unit and which, among others, generates synchronizing bytes for indicating the beginning of frames.

The interconnection unit 79 by which the exchange modules are connected with each other is, for example, a multiple line. In one extreme case, it has the form of a simple distributor in which the lines of the modules corresponding to each other are joined. In another extreme case, it has the form of a closed loop over the whole length of which the connecting points of the individual modules are distributed.

A receiver 81 transfers the electrical signals from the interconnection unit to the module, and a transmitter 83 applies the signals from the module to the interconnection unit. Within the module, the PCM and data bytes are transferred in parallel so that all connections in the drawing represent multiple lines.

Each exchange module includes its own controller 85, which independently supervises and controls the execution of operations in the module and the communication with other modules, for setting up of connections and for current information exchange. This controller receives, above all, signaling information from the attached terminals, over the bus line, and from the other modules, over the interconnection unit. It evaluates this information and directs, in turn, signaling information to the terminals or to the other modules, respectively. For this purpose it contains its own storage and processing means, as well as association tables for translation or identification of instructions or standard signaling messages, respectively.

For the actual exchange or switching, associative stores 87A and 87B in FIG. 7 are used, the principle of which was described in connection with FIGS. 5 and 6. The two associative exchange stores for voice and low speed data are combined here in one unit. This has technological advantages, since some of the control means can be used in common, and also has an organizational advantage since, depending on the requirements, more storage locations (words) can be assigned to either one or the other of the two functions. A distinction is possible by an additional bit, which is shown in the drawing as the center column of the store.

The exchange module also contains a register 89 for signaling information, which register feeds controller 85. Register 91 is provided for data and register 93 is provided for addresses which are to be transferred over special channels (segments 0 through 2) of the interconnection unit. A waiting store 95 is provided for signaling information and data, which are to be transferred over the submultiplex channel (TS1 and TS2) of the bus line, as well as for the associated receiver addresses. The waiting store is necessary because in each frame only one information unit (signaling or data byte) can be transferred to the bus line, whereas several such information units can be received per frame. For synchronizing the processes in the module with the signals on the interconnection unit, an IU slot counter 97 is provided.

An address detector 99, at receiver 81, detects the address of the module when the special channels for low speed data and for signaling are operative, so that the necessary processes for accepting the information thereafter to follow, can be initiated.

Finally, a number of electronic switches is provided, which switches are cyclically actuated by control signals for separating the different information categories from each other, or for joining them, respectively. Switches ES1 through ES3 are controlled by the slot counter of the bus line (in input block 75) and switches MS1 through MS4 are controlled by the IU slot counter 97. The operation of the switches will become more clear from the description of FIG. 7 to follow. The working position of these switches, during one frame cycle, is illustrated in the immediate following table. It should be noted here that these switches are in practice electronic switches, even though the term "switching position" is used here to facilitate explanation and understanding.

Table of Switch Positions

| Bus Line | Interconn. Unit | Switch | | | | | | |
|---|---|---|---|---|---|---|---|---|
| | | ES1 | ES2 | ES3 | MS1 | MS2 | MS3 | MS4 |
| TS0 (SYNCH.) | SEGM.0 (ADDR.1) | | | | | | b | |
| | $M_1$ | | | | | | do. | |
| | $M_2$ | | | | | | do. | $a^+$ |
| | $M_X$ | | | | | | *b* | |
| | SIGNALING | | | | | *b* | *c* | |
| TS1(ADDR.) | SEGM.1 (ADDR.2) | *b* | *a/b** | *a* | *b* | *a* | *b* | |
| | $M_1$ | do. | do. | do. | do. | do. | do. | |
| | $M_2$ | do. | do. | do. | do. | do. | do. | $b^+$ |
| | $M_X$ | do. | do. | do. | do. | *a* | *b* | |
| | SIGNALING | do. | do. | *a* | do. | *b* | *c* | |
| TS2(DATA) | SEGM.2 (DATA) | do. | do. | *b* | do. | *a* | *b* | |
| | $M_1$ | do. | do. | do. | do. | do. | do. | |
| | $M_2$ | do. | do. | do. | do. | do. | do. | $c^+$ |
| | $M_X$ | do. | do. | do. | do. | *a* | *b* | |
| | SIGNALING | *b* | *a/b** | *b* | *b* | *b* | *c* | |
| TS3 ff. | SEGM.3 ff. | *a* | | | | | *a* | |
| | $M_1$ | do. | | | | | do. | |
| | $M_2$ | do. | | | $a^+$ | | do. | |
| | $M_X$ | do. | | | | | *a* | |
| | SIGNALING | *a* | | | | *b* | *c* | |

*Switch position depends on type of information: *a* for low-speed data, *b* for signaling information.
+Switch closes only during time slot which is assigned to the resepctive module (shown for module 2 in this table).

In the following, the processes occuring during information exchange and during the setting up of connections, are briefly described in connection with FIG. 7. The function of the exchange store corresponds to the description given for FIGS. 5 and 6. The only difference is that for associative addressing, one additional bit is used in order to distinguish between the two storage areas 87A and 87B.

The current switching positions can easily be verified by using the above table and FIGS. 2 and 4.

Switching of Voice or High-Speed Data = Cyclic Switching a. Sending Module

Switch ES1 is in position *a* and voice samples are transferred from the S/P converter (in 75), over line 101 and switch ES1, to the input of the exchange store. Addressing is effected from the slot counter over line 103. In this way, one voice sample (or one data byte in cyclic switching) is read into the storage location associated with the corresponding transmission channel.

Output is controlled by slot counter 97. It receives clock signals over a line 105, and indicates at any time which time slot in which segment is presently (or after a technologically caused delay) available on the interconnection unit. The exchange store is addressed over line 107, with this segment/slot number indicating the module and the channel of the receiver. The voice sample (or the data byte, respectively) is transferred over switch MS3, which is in position *a*, to transmitter 83 and consequently to the interconnection unit.

b. Receiving Module

Voice signals are transferred from the interconnection unit over line 109, to switch MS1. This switch moves, for a short interval during each time segment (except segments 0 through 2), into position *a* (i.e., during the time slots assigned to this exchange module). In this position, the switch transfers the voice sample to output block 77 from where it is applied sequentially during the next time slot to the bus line.

Switching of Low-Speed Data = Switching with Address Transmission a. Sending module Switch ES1 is in position *b* and switch ES2 in position *a*. Accordingly, the incoming signals are gated to switch ES3. This switch is in position *a* during time slot 1. The exchange store (87B) is searched with the address of the sending terminal. The assigned receiver address (for module and terminal) is read out and transferred to register 93. During time slot 2, switch ES3 is in position *b*. The data byte is transferred from the bus line over switches ES1, ES2 and ES3 to register 91.

The output of information is effected over switches MS3 and MS4. MS3 is in position *b* during time segments 0, 1 and 2 (except during their signaling periods). During segments 0, 1 and 2, switch MS4 moves, for a short time interval, to positions *a*, *b* and *c*, respectively (i.e., each time for the duration of the time slots which are permanently assigned to the module involved). Thus, the receiving module address, the receiving terminal address and the data byte to be transmitted are transferred over switches MS4 and MS3 and transmitter 83, to the interconnection unit.

b. Receiving module

When address detector 99 has recognized its own module address during any time slot of segment 0, it gates in the corresponding time slots of segments 1 and 2 the incoming signals, i.e., the receiving terminal address and the associated data bytes, to switch MS2. Over position *a* of this switch they are gated to the waiting store 95. Switch WS2 is so operated that both information units are stored in adjacent half-registers. Store 95 is so designed that during read-out of data from the uppermost position the data in the other positions (registers) are shifted upwards. With the aid of switch WS1, an address is transferred each time during a bus line time slot 1 from one half-register, and a data byte during slot 2 from the other half-register, to switch MS1. This switch is in position *b* during time slots 1 and 2 so that the two information units are gated sequentially to output block 77 and to the bus line.

Signaling Information a. Bus line

When signaling information arrives on the bus line, switches ES1 and ES2 are in position *b*. The sender address and the signaling byte are gated sequentially into register 89, and from there over line 111 to the controller. The controller can now initiate the appropriate operation. If the controller wants to send signaling information to a terminal, it sequentially transfers the address and the signaling byte over line 113 to waiting store 95. This is necessary because only one channel per frame (time slots 1 and 2) is available for the output of low-speed data, as well as for signaling information. The output from the waiting store has been described above.

b. Interconnection Unit

If during the signaling period of any segment on the interconnection unit its own module address is recognized, address detector 99 gates the subsequently following information to switch MS2, which is then in position *b*. The signaling information, which is possibly accompanied by a sending address, is then transferred over line 115 to the controller.

If the controller wants to send signaling information to another module, it sends the address of this module and the actual information over line 117 to switch MS3, when the latter is in position *c* (i.e., during the signaling period of any segment). Prior to that, however, it must be insured that the respective signaling period is not yet occupied.

Provisions may also be made such that, for signaling purposes, the terminals or the modules can recognize, in addition to their own particular address, a general address which is valid for all terminals or all modules, respectively. In this way the simultaneous transmission of a message to all terminals or modules, respectively, is possible.

Setting up of a Connection a. Voice Switching

When a terminal requires a connection to another terminal, it transmits in the submultiplex channel, thereby signaling a request to the controller of its exchange module. This in turn effects the sending, over the submultiplex channel, of an acknowledgement with an order to transmit the receiver address. The terminal now sends, in the same manner, the receiver address to the controller. The controller in turn sends (after having converted the address), over the signaling area of the interconnection unit, the request for connection together with the receiver address and the sender address, to the receiver module.

Thereafter, the receiver module determines whether the receiver terminal and a bus line channel are available. If so, the receiver module then sends a calling signal to the terminal, assigns a channel to this terminal and sends a positive acknowledgement message, together with the assigned channel number, over the interconnection unit signaling area, to the sending module. The controller of the sending module then assigns a free channel to the sending terminal, writes the time segment and time slot number of the receiver into the corresponding position of the exchange store, and notifies the sending terminal and the receiving module of the channel number which was assigned to the sender. At the exchange store of the receiving module, the channel and module number of the sender is written into the storage location of the receiving channel. At this point all preparations for the connection have been made.

b. switching of low-Speed Data (With Addresses)

The sending terminal sends its request for a connection to the module controller. This, in turn, effects the sending of an acknowledgement, and requests transmittal of the receiver address. The sending terminal then sends the receiver address to the controller. After conversion of this address, the sending and the receiver address are written together into one position of the exchange store. Thereafter, the state of the receiving terminal is checked, the call is sent and a store in the receiving module is loaded with the respective addresses. All this signaling information is sent over the submultiplex channel of the bus line or over a signaling area of the interconnection unit, as usual. Signaling between two terminals (the so-called "end-to-end signaling"), which may be required for system purposes, is achieved in the same way as the transmission of low speed data.

The above description in regard to setting up of a connection again illustrates the modular and decentral character of the inventive exchange. Control and storage are so distributed that each communication connection can be set up and maintained solely by the two exchange modules which are involved.

What is claimed is:

1. A time division multiplex communication system for exchanging information between any pair of a plurality of system terminals, comprising:

a plurality of exchange module means each having a bus line coupled thereto for connecting therewith any of a plurality of associated bus line terminals which are fewer in number than the number of system terminals, each of said exchange module means including bus line input and output means for exchanging information in first order time frames by synchronous time division multiplex between each of the respective said exchange module means and any of the said associated bus line terminals connected thereto, said bus line and output means including means to transmit and receive information to and from connected terminals over time channels in said first order time frames exclusively assigned to that purpose, each of said exchange module means also including storage means coupled to its said bus line input means for receiving information from sending terminals connected thereto and storing said information for readout at a time corresponding to the time assigned to the terminal to receive said stored information;

interconnection unit means for interconnection each of said exchange module means with all of the others;

each of said exchange module means further including interconnection unit input and output means for exchanging information in second order time frames by synchronous time division multiplex between each of said exchange module means and the others, and interconnection unit input and output means further including selection and control means to cause said information to be exchanged between each of said exchange module means and the others by transmitting said information within time segments of said second order time frames with said time segments being divided into time slots equal in number to the number of exchange module means so that each said exchange module means is assigned an exclusive time slot within each time segment and with said time segments being equal in number to the number of said time channels in said first order time frames, said selection and control means being coupled to said storage means for causing said storage means to read out the appropriate stored information therein during the time slot and time segment respectively assigned to the exchange module means and associated receiving terminal to which said stored information is to be sent.

2. The system as set forth in claim 1 wherein the said bus line and output means of each of said exchange module means includes means for providing within the first order time frames of each of said exchange module means an asynchronous sub-multiplex channel for the transmission of slowly generated data, with said slowly generated data being sent over said sub-multiplex channel with address indications therewith.

3. The system as set forth in claim 2 wherein the said interconnection unit input and output means of each of said exchange module means operate to control communication of slowly generated data over said interconnection unit means by assigning the respective time slots within the time segments of the said second order time frames of said interconnection unit means corresponding to the said sub-multiplex channel of the exchange module means to those exchange module means desiring to send slowly generated data, with the said exchange module means desiring to send slowly generated data sending the address of both the appropriate receiving exchange module means and receiving terminal over said sub-multiplex channel along with said slowly generated data.

4. The system as set forth in claim 3 wherein the first time segment of the said second order time frames of said interconnection unit means is assigned to the said sub-multiplex channel of the exchange module means for transmitting the addresses of the respective receiving exchange module means while the second time segment of the said second order frames of said interconnection unit means is assigned to the said sub-multiplex channel of the exchange module means for transmitting the addresses of the respective receiving terminals associated with said respective receiving exchange module means.

5. A time division multiplex communication system for exchanging information between any pair of a plurality of system terminals, comprising:

a plurality of exchange module means each having a bus line coupled thereto for connecting therewith any of a plurality of associated bus line terminals fewer in number than the number of system terminals, each of said exchange module means including bus line input and output means for exchanging information in first order time frames by time division multiplex between each of the respective said exchange module means and any of the said associated bus line terminals connected thereto, said bus line input and output means including means to transmit and receive information to and from connected terminals over time channels in said first order time frames exclusively assigned to that purpose, each of said exchange module means also including associative storage means coupled to its said bus line input means for receiving information from sending terminals connected thereto and associatively storing said information in accordance with the particular exchange module means and associated receiving terminal to which it is to be sent;

interconnection unit means for interconnecting each of said exchange module means with all of the others;

each of said exchange module means further including interconnection unit input and output means for exchanging information in second order time frames by time division multiplex between each of said exchange module means and the others, said interconnection unit input and output means further including selection and control means to cause said information to be exchanged between each of said exchange module means and the others by transmitting said information within time segments of said second order time frames with said time segments being divided into time slots equal in number to the number of exchange module means so that each of said exchange module means is assigned an exclusive time slot within each time segment and with said time segments being equal in number to the number of said time channels in said first order time frames, said selection and control means being coupled to said associative storage means for causing said storage means to read out the appropriate stored information therein during the time slot and time segment respectively assigned to the exchange module means and associated receiving terminal to which said stored information is to be sent.

6. A time-division multiplex communications system for communicating data between any of a plurality of terminals which plurality of terminals are divided into a plurality of groups of terminals, the improvement comprising:

a plurality of exchange module means corresponding in number to the number of groups of terminals in said plurality of groups of terminals with individual ones of said plurality of exchange module means being respectively coupled by bus line means to all of the terminals within individual ones of said plurality of groups of terminals so that each terminal of said plurality of terminals is associated with an individual exchange module means via its associated bus line means;

each of said exchange module means including bus line information exchange and control means for controlling the exchange of the high speed data of terminals connected thereto via its associated bus line means over a first order time-division multiplex system by exclusively assigning time slots to said terminals connected thereto which have said high speed data to be exchanged and for controlling the exchange of the low speed data of terminals connected thereto via said associated bus line means over said first order time-division multiplex system by assigning common time slots to any of said terminals connected thereto which have said low speed data to be exchanged so as to thereby form an asynchronous sub-multiplex channel of said first order time-division multiplex system by the sending of the address indications therewith of terminals connected thereto which have said low speed data to be exchanged;

interconnection unit means for coupling each of said exchange module means to one another; and each of said exchange module means further including interconnection unit information exchange and control means for controlling the exchange of information over said interconnection unit means between said exchange module means in a second order time-division multiplex system so as to cause all like time slots of the respective exchange module means in said first order time-division multiplex system to regularly occur in successive time slots in respective time segments of the time frames of said second order time-division multiplex system with the number of segments of each time frame of said second order time-division multiplex system being equal to the number of time slots in the time frames of said first order time-division multiplex system and with the number of time slots in the respective time segments of the time frames of said second order time-division multiplex system being equal to the number of said exchange module means.

7. The system as set forth in claim 6 wherein each of said exchange module means includes storage means for intermediately storing therein information from sending terminals until the assigned time slot and time segment of the receiving terminal therefor occurs on said interconnection unit means.

8. A time-division multiplex communications system comprising:

a plurality of exchange module means each including bus line input and output means for synchronously controlling the exchange of information between each of said exchange module means and a plurality of terminals associated therewith by exclusively assigning a given discrete time channel within first order time-division multiplex time frames to respective terminals connected thereto;

a like plurality of bus line means respectively coupled to each of said exchange module means, each of said bus line means being coupled to the said bus line input and output means of each of said exchange module means to thereby permit a plurality of terminals to be coupled thereto;

a plurality of terminal means coupled to each of said bus line means for connection to said exchange module means;

interconnection unit means coupling said plurality of exchange module means to one another; and each of said plurality of exchange module means further including interconnection unit input and output means for exchanging information between itself and all other exchange module means over said interconnection unit means, said interconnection unit input and output means exchanging information by causing information to be transmitted to receiving exchange module means during time slots of time segments within second order time-division multiplex time frames with the number of said time segments being equal to the number of said time channels in said first order time frames and with the number of said time slots within each of said time segments being equal to the number of said exchange module means so that each of said exchange module means may be exclusively assigned a discrete time slot within each of said time segments for receiving information.

9. The system as set forth in claim 8 wherein each of said exchange module means employ an associative store for exchanging information.

* * * * *

UNITED STATES PATENT AND TRADEMARK OFFICE
CERTIFICATE OF CORRECTION

PATENT NO. : 3,856,993

DATED : December 24, 1974

INVENTOR(S) : Felix H. Closs et al.

It is certified that error appears in the above-identified patent and that said Letters Patent are hereby corrected as shown below:

In the claims

Col. 13, line 42 Change "interconnection" to --interconnecting

Col. 13, line 50 Change "others, and interconnection" to --others, said interconnection--

Col. 14, line 4 Change "line and" to --line input and--

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*